US011973458B2

(12) United States Patent
Kimura (10) Patent No.: US 11,973,458 B2
(45) Date of Patent: Apr. 30, 2024

(54) CONTROLLER OF STEPPING MOTOR, CONTROL METHOD OF STEPPING MOTOR, AND STEPPING MOTOR DRIVE CONTROLLING SYSTEM

(71) Applicants: Kabushiki Kaisha Toshiba, Tokyo (JP); Toshiba Electronic Devices & Storage Corporation, Tokyo (JP)

(72) Inventor: Hideki Kimura, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 6 days.

(21) Appl. No.: 17/533,795

(22) Filed: Nov. 23, 2021

(65) Prior Publication Data
US 2022/0085739 A1 Mar. 17, 2022

Related U.S. Application Data

(63) Continuation of application No. 16/519,650, filed on Jul. 23, 2019, now Pat. No. 11,211,884.

(30) Foreign Application Priority Data

Mar. 4, 2019 (JP) .................... 2019-038978

(51) Int. Cl.
*H02P 8/38* (2006.01)
*H02P 8/12* (2006.01)
*H02P 8/22* (2006.01)

(52) U.S. Cl.
CPC .................. *H02P 8/38* (2013.01); *H02P 8/12* (2013.01); *H02P 8/22* (2013.01); *H02P 2205/01* (2013.01)

(58) Field of Classification Search
CPC ...... H02P 8/12; H02P 8/22; H02P 8/38; H02P 2205/01
See application file for complete search history.

(56) References Cited

U.S. PATENT DOCUMENTS 5,740,040 A * 4/1998 Kifuku .................. G01P 3/44
  318/599
6,400,107 B1 * 6/2002 Nakatani .............. H02P 6/085
  318/400.32

(Continued)

FOREIGN PATENT DOCUMENTS

| JP | H11-075396 A | 3/1999 |
| JP | 2011-015553 A | 1/2011 |
| JP | 5556709 B2 | 7/2014 |

*Primary Examiner* — Rina I Duda
(74) *Attorney, Agent, or Firm* — Maier & Maier, PLLC (57) ABSTRACT

According to one embodiment, a controller of a stepping motor includes a table generating unit and a current controlling unit. The table generating unit generates a data table of a threshold by using values of induced voltage at frequencies of switching signal that changes a set value of a drive current, the threshold being proportional to a frequency of the switching signal within an operation region in which the frequency of the switching signal is lower than a predetermined frequency, the values of the induced voltage including a first induced voltage generated at a first frequency of the switching signal and a second induced voltage generated at a second frequency of the switching signal. The current controlling unit controls a value of the drive current in accordance with a comparison result between the threshold and an induced voltage that is detected at a frequency lower than the predetermined frequency.

18 Claims, 8 Drawing Sheets

(56) References Cited

U.S. PATENT DOCUMENTS

| | | | |
|---|---|---|---|
| 8,232,759 B2* | 7/2012 | Tadano | H02P 27/02 |
| | | | 318/727 |
| 9,871,485 B2* | 1/2018 | Kimura | H02P 29/50 |
| 9,906,179 B1* | 2/2018 | Kimura | H02P 8/18 |
| 2016/0290312 A1* | 10/2016 | Calderone | F03B 17/061 |
| 2018/0309400 A1 | 10/2018 | Kitamura | |
| 2019/0058424 A1 | 2/2019 | Ito | |

* cited by examiner

CONTROLLER OF STEPPING MOTOR, CONTROL METHOD OF STEPPING MOTOR, AND STEPPING MOTOR DRIVE CONTROLLING SYSTEM

CROSS-REFERENCE TO RELATED APPLICATIONS

This application is a continuation of U.S. application Ser. No. 16/519,650 filed on Jul. 23, 2019 and is based upon and claims the benefit of priority from Japanese Patent Application No. 2019-038978, filed on Mar. 4, 2019; the entire contents of which are incorporated herein by reference.

FIELD

The embodiment described herein relates generally to a controller of a stepping motor, a control method of a stepping motor, and a stepping motor drive controlling system.

BACKGROUND

Conventionally, there has been disclosed a technology that controls drive current in accordance with torque, in order to improve efficiently of a stepping motor. The technology attempts to reduce, in a state where a needed torque has reduced, the drive current to improve the efficiently. The stepping motor operates over a wide range from a low speed rotation to a high speed rotation. Drive current having margin from a needed torque is generally supplied in order to prevent step-out. However, supply of surplus drive current increases the power consumption.

DETAILED DESCRIPTION

In general, according to one embodiment, a controller of a stepping motor includes a table generating unit and a current controlling unit. The table generating unit generates a data table of a threshold by using values of induced voltage at frequencies of switching signal that changes a set value of a drive current, the threshold being proportional to a frequency of the switching signal within an operation region in which the frequency of the switching signal is lower than a predetermined frequency, the values of the induced voltage including a first induced voltage generated at a first frequency of the switching signal and a second induced voltage generated at a second frequency of the switching signal. The current controlling unit controls a value of the drive current in accordance with a comparison result between the threshold and an induced voltage that is detected at a frequency lower than the predetermined frequency.

Exemplary embodiments of a controller of a stepping motor, a control method of a stepping motor, and a stepping motor drive controlling system will be explained below in detail with reference to the accompanying drawings. The present invention is not limited to the following embodiments.

First Embodiment

Figure 1:
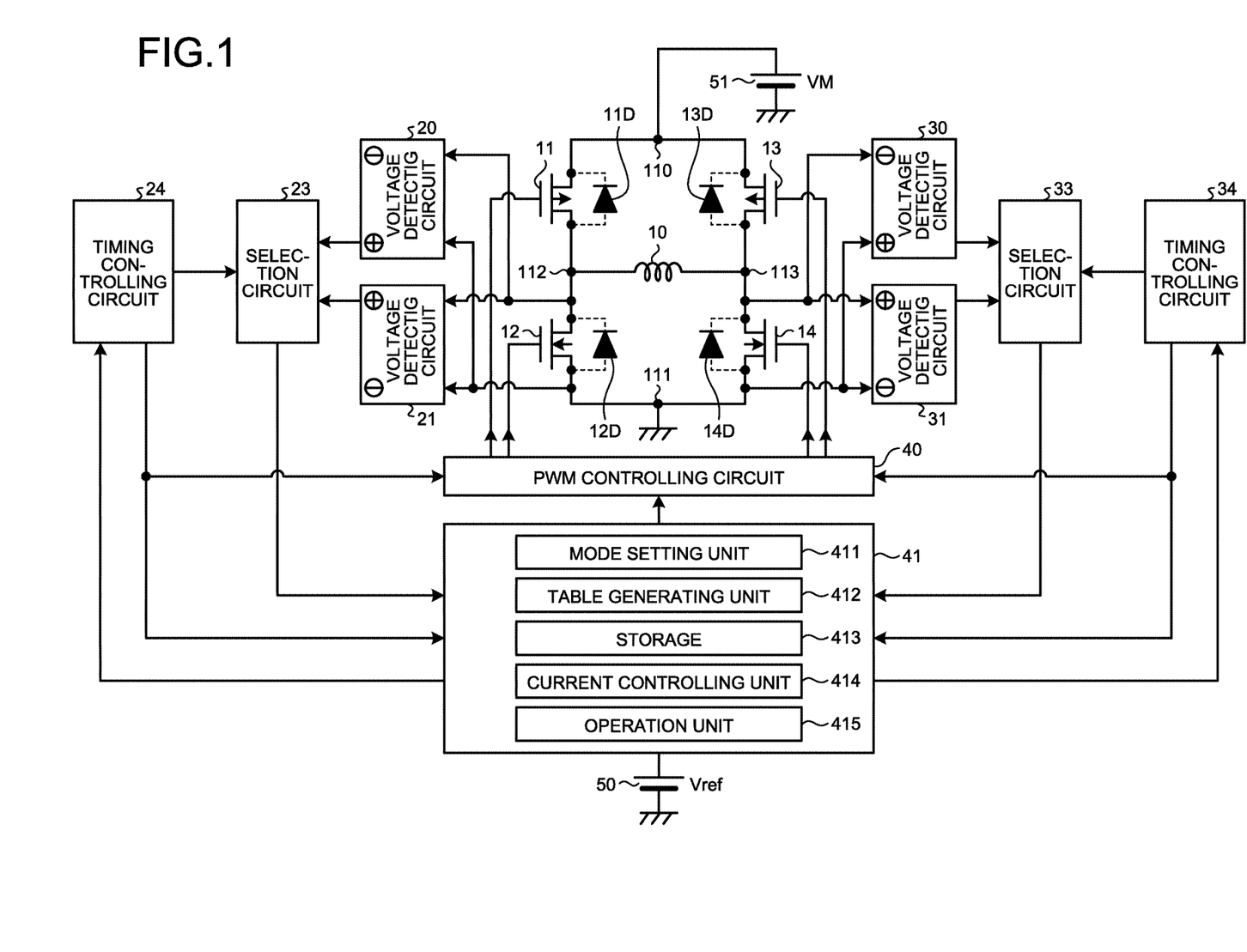
FIG. 1 is a diagram illustrating a controller of a stepping motor according to one embodiment.

FIG. 1 is a diagram illustrating a controller of a stepping motor according to one embodiment. A configuration for one phase is illustrated therein. The present embodiment includes PMOS transistors 11 and 13 and NMOS transistors 12 and 14 constituting an H switch that supplies drive current to an exciting coil 10.

Source-drain paths of the PMOS transistor 11 and the NMOS transistor 12 are serially connected to a power terminal 110 and a grounding terminal 111 therebetween. Similarly, source-drain paths of the PMOS transistor 13 and the NMOS transistor 14 are serially connected to the power terminal 110 and the grounding terminal 111 therebetween. Drains of the PMOS transistor 11 and the NMOS transistor 12 are connected to an output terminal 112. Drains of the PMOS transistor 13 and the NMOS transistor 14 are connected to an output terminal 113. The exciting coil 10 is connected to the output terminals 112 and 113 therebetween. Drive current is supplied to the exciting coil 10 and a magnetic field is generated so as to rotate a rotor (not illustrated) of a stepping motor. The exciting coil 10 and the rotor constitute the stepping motor. The stepping motor constitutes, together with a controller, a stepping motor drive controlling system.

The MOS transistors 11 to 14 respectively include parasitic diodes 11D to 14D. Each of the parasitic diodes 11D to 14D forms a current path that is connected in parallel with a source-drain path of the corresponding MOS transistor through which drain current in a reverse direction flows.

A voltage detecting circuit 20 is provided to detect a source-drain voltage with reference to a drain of the NMOS transistor 12. The voltage detecting circuit 20 detects a drain-source voltage of the NMOS transistor 12 in which drain current in a reverse direction flows. A detection value of the voltage detecting circuit 20 is supplied to a selection circuit 23.

A voltage detecting circuit 21 is provided to detect a drain-source voltage of the NMOS transistor 12 with reference to a ground potential. The voltage detecting circuit 21 detects a drain-source voltage of the NMOS transistor 12 in which drain current in a forward direction flows. A detection value of the voltage detecting circuit 21 is supplied to the selection circuit 23. The selection circuit 23 causes a timing controlling circuit 24 to select one of outputs of the voltage detecting circuits 20 and 21, and supplies the selected output to a drive controlling circuit 41.

For the NMOS transistor 14, voltage detecting circuits 30 and 31, a selection circuit 33, and a timing controlling circuit 34 are provided.

The voltage detecting circuit 30 detects, with reference to a drain, a drain-source voltage of the NMOS transistor 14 through which drain current in a reverse direction flows. A detection value of the voltage detecting circuit 30 is supplied to the selection circuit 33. The voltage detecting circuit 31 detects, with reference to the ground potential, a source-drain voltage of the NMOS transistor 14 in which drain current in a forward direction flows. A detection value of the voltage detecting circuit 31 is supplied to the selection circuit 33.

The selection circuit 33 causes the timing controlling circuit 34 to select one of outputs of the voltage detecting circuits 30 and 31, and supplies the selected output to the drive controlling circuit 41.

The timing controlling circuits 24 and 34 control a timing for turning ON/OFF each of the MOS transistors 11 to 14. For example, the mode is switched into (i) a charging mode in which the PMOS transistor 11 and the NMOS transistor 14 are turned ON, (ii) a discharging mode in which the NMOS transistor 12 and the PMOS transistor 13 are turned ON, (iii) a low-speed discharging mode in which the NMOS transistors 12 and 14 are turned ON, or the like.

The timing controlling circuits 24 and 34 supply, to a PWM controlling circuit 40 and the drive controlling circuit 41, switching signals each of which changes a set value of drive current of a corresponding micro-step. In response to the switching signal, the PWM controlling circuit 40 generates a PWM signal having a duty ratio according to the set value of drive current, and supplies the generated PWM signal to the MOS transistors 11 to 14.

When being in the same excitation mode, a rotation frequency of the stepping motor changes in accordance with a frequency of the switching signal. Therefore, the drive controlling circuit 41 is capable of detecting a rotation frequency of the stepping motor by using the frequency of the switching signal. Thus, for convenience of explanation, a "rotation frequency" may be used as a word indicating both of a frequency of the switching signal and a rotation frequency of the stepping motor.

The timing controlling circuits 24 and 34 respectively supply, to the selection circuits 23 and 33, signals each of which controls a timing for detecting an induced voltage or a drive current. Each of the selection circuits 23 and 33 supplies, to the drive controlling circuit 41, an output (induced voltage information) of corresponding one of the voltage detecting circuits 20, 21, 30, and 31, which is selected in response to a timing controlling signal.

The drive controlling circuit 41 supplies, to the PWM controlling circuit 40, a control signal that controls, in accordance with the output from the selection circuits 23 and 33, a drive current to be supplied to the exciting coil 10. The drive controlling circuit 41 is connected to a power source 50 that supplies a reference voltage Vref. The reference voltage Vref is used as voltage for setting a drive current. For example, the reference voltage Vref is used as voltage for setting an upper-limit value of the drive current.

The drive controlling circuit 41 includes a mode setting unit 411. The mode setting unit 411 sets an excitation mode of the stepping motor. Furthermore, the mode setting unit 411 sets an excitation mode on the basis of induced voltage information. The excitation mode includes a 2 phase excitation, a 1-2 phase excitation, a W1-2 phase excitation, a 2W1-2 phase excitation, and a 4W1-2 phase excitation, etc. For example, the angle of rotation of a W1-2 phase excitation per step is ½ of that of a 1-2 phase excitation and ¼ of that of 2 phase excitation. Accordingly, a 2 phase excitation, a 1-2 phase excitation and a W1-2 phase excitation are also referred to as a full step excitation, a half step excitation and a quarter step excitation, respectively.

The drive controlling circuit 41 includes a table generating unit 412. The table generating unit 412 generates, on the basis of the induced voltage information, a data table obtained by correcting a threshold for detecting an induced voltage. Within an operation region on a low-speed side, in which a generated induced voltage is small due to a low rotation frequency, the table generating unit 412 generates a correction table having a threshold that is reduced in proportion to the frequency. Thus, it is possible to appropriately adjust, in accordance with a torque, a drive current even within an operation region of a small rotation frequency.

The drive controlling circuit 41 includes a storage 413. The storage 413 stores therein set values of a drive current associated with excitation modes, various parameters of a frequency of a switching signal and the like, induced voltage information, etc.

The drive controlling circuit 41 includes a current controlling unit 414. The current controlling unit 414 controls a drive current in accordance with a comparison result between an induced voltage and the threshold. For example, when an induced voltage is larger than the threshold, the current controlling unit 414 executes a control for reducing a drive current.

The drive controlling circuit 41 includes an operation unit 415. The operation unit 415 computes a time difference between (i) a determination time interval from a time point when a drive current becomes zero to a time point when the next switching signal is supplied, and (ii) a predetermined set time interval stored in the storage 413. The predetermined set time interval is set in consideration of, for example, a processing speed of the operation unit 415. For example, the operation unit 415 counts a clock signal (not illustrated) generated within the determination time interval so as to compute a determination time interval from a time point when a drive current becomes zero to the next switching signal. Note that a period of the switching signal may be previously set in accordance with an excitation mode. Thus, the determination time interval may be computed by using information on a time point when a drive current becomes zero and a period of the previously set switching signal.

The PWM controlling circuit 40 supplies a PWM signal for controlling turning ON/OFF to gates of the MOS transistors 11 to 14. The PWM controlling circuit 40 controls, in accordance with the control signal transmitted from the drive controlling circuit 41, an turning-ON time point of each of the MOS transistors 11 to 14 so as to increase or reduce a drive current to be supplied to the exciting coil 10, and generates a PWM signal for executing a control that changes an excitation mode of the stepping motor.

The drive controlling circuit 41 supplies to the PWM controlling circuit 40, in accordance with induced voltages detected at the output terminals 112 and 113, a control signal to adjust the drive current. It has been known that an induced voltage is generated when the drive current is surplus with respect to a needed torque. Thus, when a drive current is adjusted in accordance with the induced voltage, it is possible to effectively reduce power consumption while preventing supply of a surplus drive current.

The induced voltage appears as an output voltage when a drive current is zero. Thus, a voltage of the output terminal 112 or 113 when the drive current is zero, is detected so as to detect an induced voltage. In other words, the induced voltage is considered as an output voltage when the drive current is zero.

For example, the NMOS transistor 12 is turned OFF when the drive current is zero, and an induced voltage is detected by a voltage of the output terminal 112 at this time, in other words, a source-drain voltage of the NMOS transistor 12. A source-drain voltage when the NMOS transistor 12 is ON is detected so as to detect that a drive current is zero when the voltage becomes zero. The same is applied to the NMOS transistor 14.

Thus, an induced voltage is detected or the fact that a drive current becomes zero is detected, in accordance with a conduction state of the NMOS transistors 12 and 14.

When a determination time interval becomes shorter than a predetermined time interval, the drive controlling circuit 41 supplies, to the PWM controlling circuit 40 and the timing controlling circuits 24 and 34, a signal for executing a control that changes into an excitation mode to extend a period of the switching signal. Thus, a width of a micro-step of the drive current is extended to ensure a time interval for reliably detecting the induced voltage, and the drive current is controlled on the basis of an induced voltage generated in accordance with a torque.

According to the present embodiment, within an operation region in which a rotation frequency is low and thus the induced voltage is small, a threshold of the induced voltage is reduced in proportion to the frequency. Thus, it is possible to enlarge an operation range in which an induced voltage is able to be detected, and further to enlarge a control range of the drive current according to a torque. Therefore, it is possible to appropriately reduce the power consumption while preventing step-out.

When detection of an induced voltage becomes difficult because the rotation frequency is high speed, the mode is changed into an excitation mode in which a width of a micro-step is extended, to be able to detect the induced voltage. Thus, a drive current is adjusted, on the basis of the detected induced voltage, in accordance with a torque. In other words, adjustment of a drive current according to a torque is executed to be able to realize prevention against step-out and low power consumption.

Moreover, it is possible to correct a threshold on a low-speed side and further to adjust a period of a switching signal on a high-speed side, in real time in accordance with an actual operation state. In other words, an appropriate control according to an operation state of the stepping motor is able to be executed over a wide-range operation region.

Figure 2:
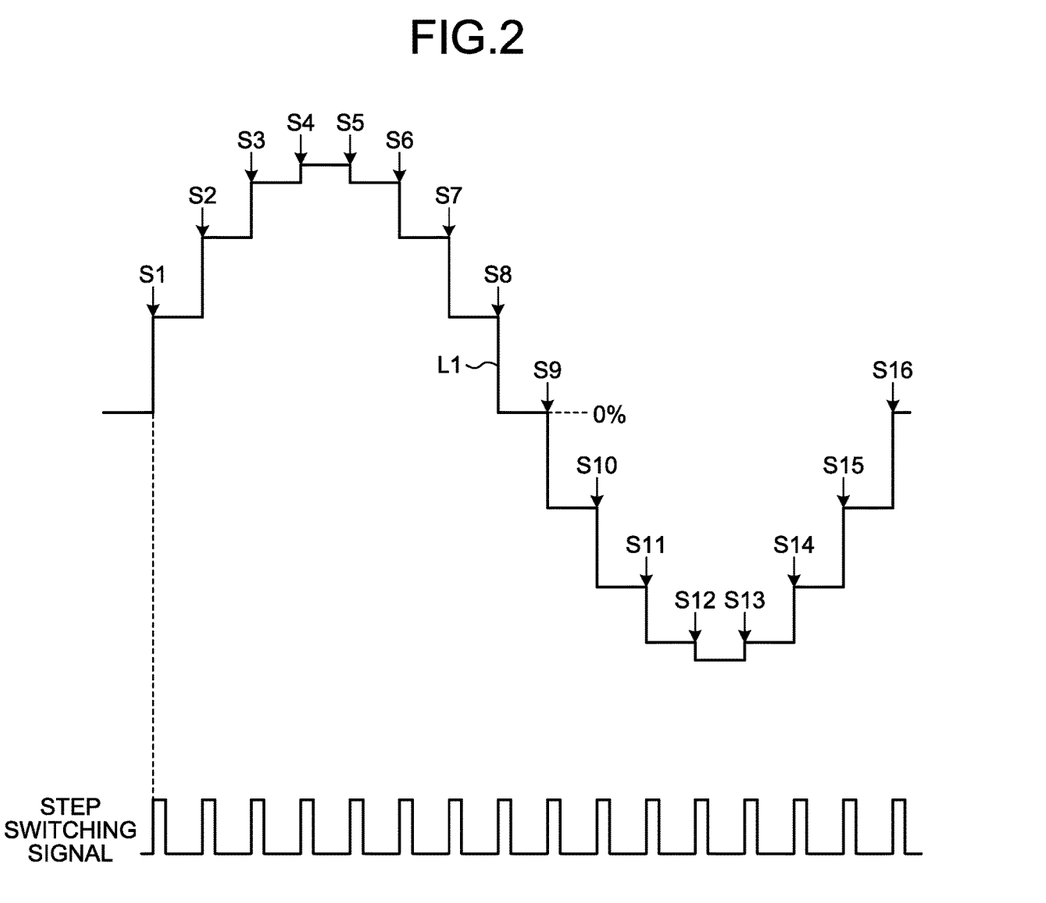
FIG. 2 is a diagram illustrating relation between drive current and switching signal.

FIG. 2 is a diagram illustrating relation between the drive current and the switching signal. A drive current waveform L1 of a micro-step is illustrated in an upper part of FIG. 2, and the switching signal is illustrated in a lower part of FIG. 2. At a rising timing of the switching signal, the step is switched. In FIG. 2, an example of the excitation mode is illustrated, in which a stepping motor makes one rotation by 16 steps. For example, the number of steps is changed by the switching signal so as to execute a control for changing the excitation mode.

At each of timings S1 to S16 of the switching signal, a duty ratio of the PWM signal is adjusted so as to adjust a value of the drive current at a corresponding step. During a period from the timing S4 to the timing S5 illustrated in FIG. 2, an upper-limit value of the drive current is adjusted by a duty ratio of the PWM signal.

A value of the drive current of each step is maintained by ON/OFF control of the MOS transistors 11 to 14. In a step at which the drive current is set to zero, an induced voltage is detected, or a time point when the drive current becomes zero is detected. In other words, the step at which the drive current is set to zero (0%) is a detection time interval for detecting an induced voltage to execute control according to a torque. The detection time intervals illustrated in FIG. 2 are a step between timings S8 and S9 and a step between timings S16 and S1.

In excitation modes having the same step number, a rotation frequency of the stepping motor is changed by a frequency of a switching signal. In other words, the frequency of the switching signal is increased to increase the rotation frequency of the stepping motor. Therefore, the frequency of the switching signal becomes an index indicating the rotation frequency of the stepping motor.

Figure 3:
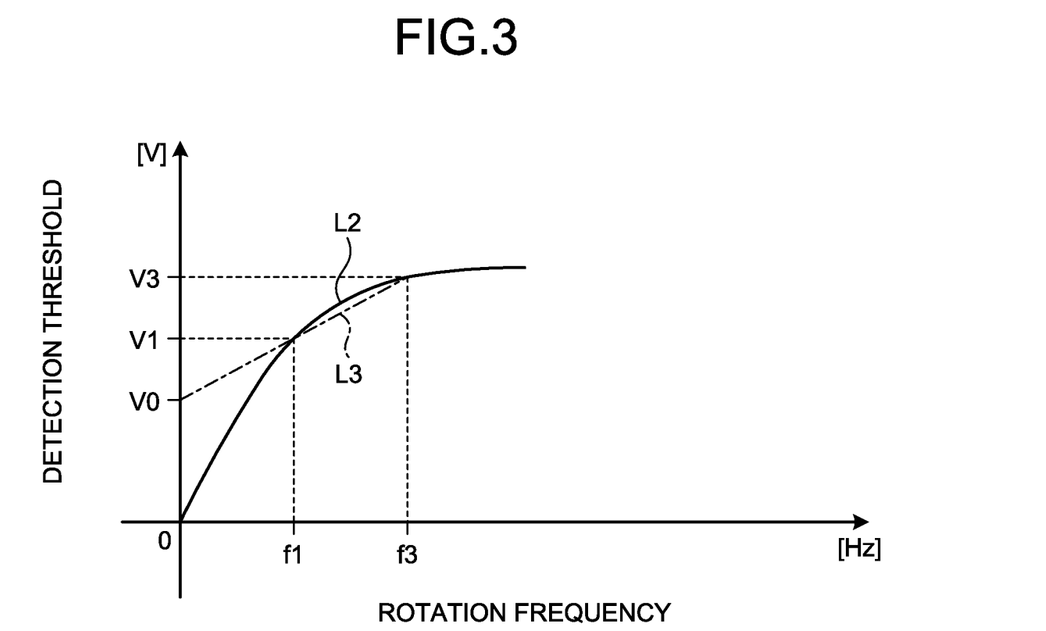
FIG. 3 is a diagram illustrating one example of a control method on a low-speed side.

FIG. 3 is a diagram illustrating one example of a control method on a low-speed side. The rotation frequency of the stepping motor is indicated on the lateral axis, and a threshold of the induced voltage is indicated on the vertical axis. In other words, the rotation frequency of the lateral axis corresponds to the frequency of the switching signal. The same applies hereinafter. A solid line L2 indicates the induced voltage.

Assume that a frequency of the switching signal when the induced voltage is turned into a saturated state in a case where the stepping motor operates in an unloaded state is a rotation frequency f3. An induced voltage V3 at the rotation frequency f3 at this time is detected. When the induced voltage is larger than the detected induced voltage V3, it indicates a state where the drive current is supplied in surplus with respect to a needed torque. Therefore, the induced voltage V3 is a threshold for control over the drive current at a rotation frequency higher than the rotation frequency f3.

Next, for example, a frequency of the switching signal is reduced to a rotation frequency f1 so as to detect an induced voltage V1 at this time. The rotation frequency f1 is a half of the rotation frequency f3.

A correction-data line L3 of the threshold at a rotation frequency f is indicated by a formula (1) on the basis of values of the rotation frequencies f1 and f3 and values of the induced voltages V1 and V3. V0 is computed as a threshold when the rotation frequency is zero (0). Computation of the formula (1) is executed by the operation unit 415.

$$V = V0 + [(V3 - V1)/(f3 - f1)] \times f \quad (1)$$

A threshold V obtained by using the formula (1) and a value of the induced voltage detected at the corresponding rotation frequency f are compared with each other. When the induced voltage is higher than the threshold, control for reducing the drive current is executed. On the other hand, when the induced voltage is lower than the threshold, control for increasing the drive current is executed. According to this control, step-out in a low-speed operation is able to be prevented, and the drive current is able to be appropriately adjusted in accordance with a torque.

Figure 4:
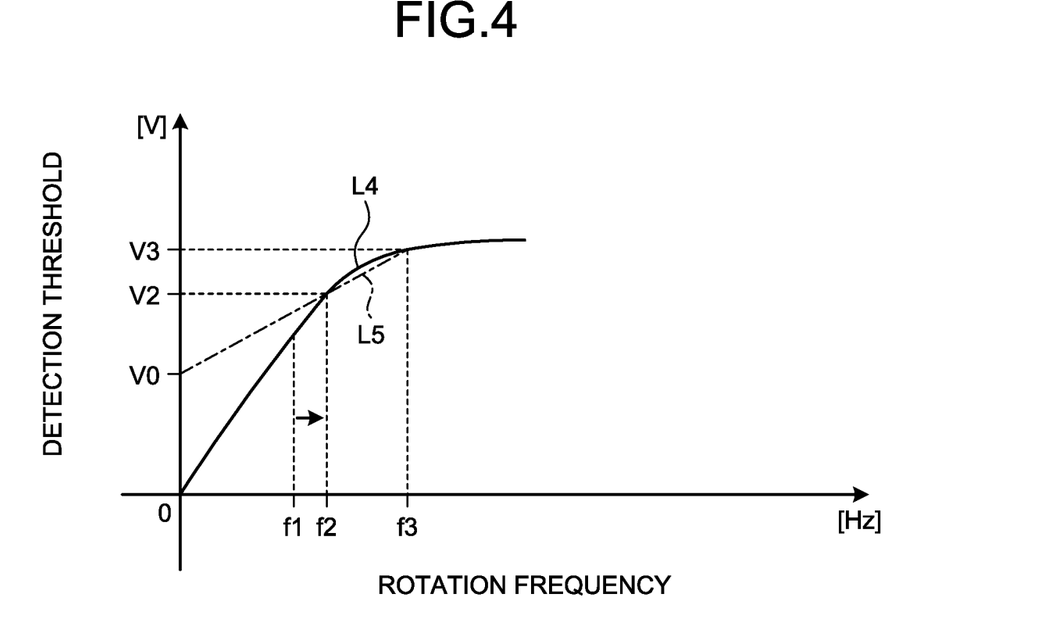
FIG. 4 is a diagram illustrating another example of the control method on the low-speed side.

FIG. 4 is a diagram illustrating another example of the control method on the low-speed side. The rotation frequency of the stepping motor is indicated on the lateral axis, and a threshold of the induced voltage is indicated on the vertical axis. A solid line L4 indicates the induced voltage. Similarly to the case illustrated in FIG. 3, the induced voltage V3 at the rotation frequency f3 when the induced voltage is turned into a saturated state is detected and recorded.

The frequency of the switching signal is reduced to, for example, the rotation frequency f1 that is half of the rotation frequency f3. When an induced voltage is not able to be detected, the rotation frequency is increased to a state in which the induced voltage is able to be detected. A lower-limit rotation frequency f2, at which the induced voltage is detected, and an induced voltage V2 at this time are recorded.

A correction-data line L5 of the threshold is indicated by a formula (2) on the basis of values of the rotation frequencies f2 and f3 and values of the induced voltages V2 and V3 at this time.

$$V = V0 + [(V3 - V2)/(f3 - f2)] \times f \qquad (2)$$

Within a low-speed operation range of the rotation frequencies f2 to f3, a threshold obtained by the formula (2) and an induced voltage detected at the corresponding rotation frequency f are compared with each other. When the induced voltage is higher than the threshold, control for reducing the drive current is executed. On the other hand, when the induced voltage is lower than the threshold, control for increasing the drive current is executed. According to this control, step-out in a low-speed operation is able to be prevented, and the drive current is able to be appropriately adjusted in accordance with a torque.

In the example of the above-mentioned control method, the case is explained where a correction-data line is single; however, a plurality of correction-data lines may be provided. For example, in the example illustrated in FIG. 3, similarly to the formula (1), by using a value of a middle rotation frequency between the rotation frequencies f1 and f3 and a value of the induced voltage at the middle rotation frequency, correction-data lines within a range from the rotation frequency f3 to the middle rotation frequency and a range from the middle rotation frequency to the rotation frequency f1 may be computed. Note that, the rotation frequency f1 is not limited to a half of the rotation frequency f3, and may be arbitrarily set, for example, one third of the rotation frequency f3.

Figure 5:
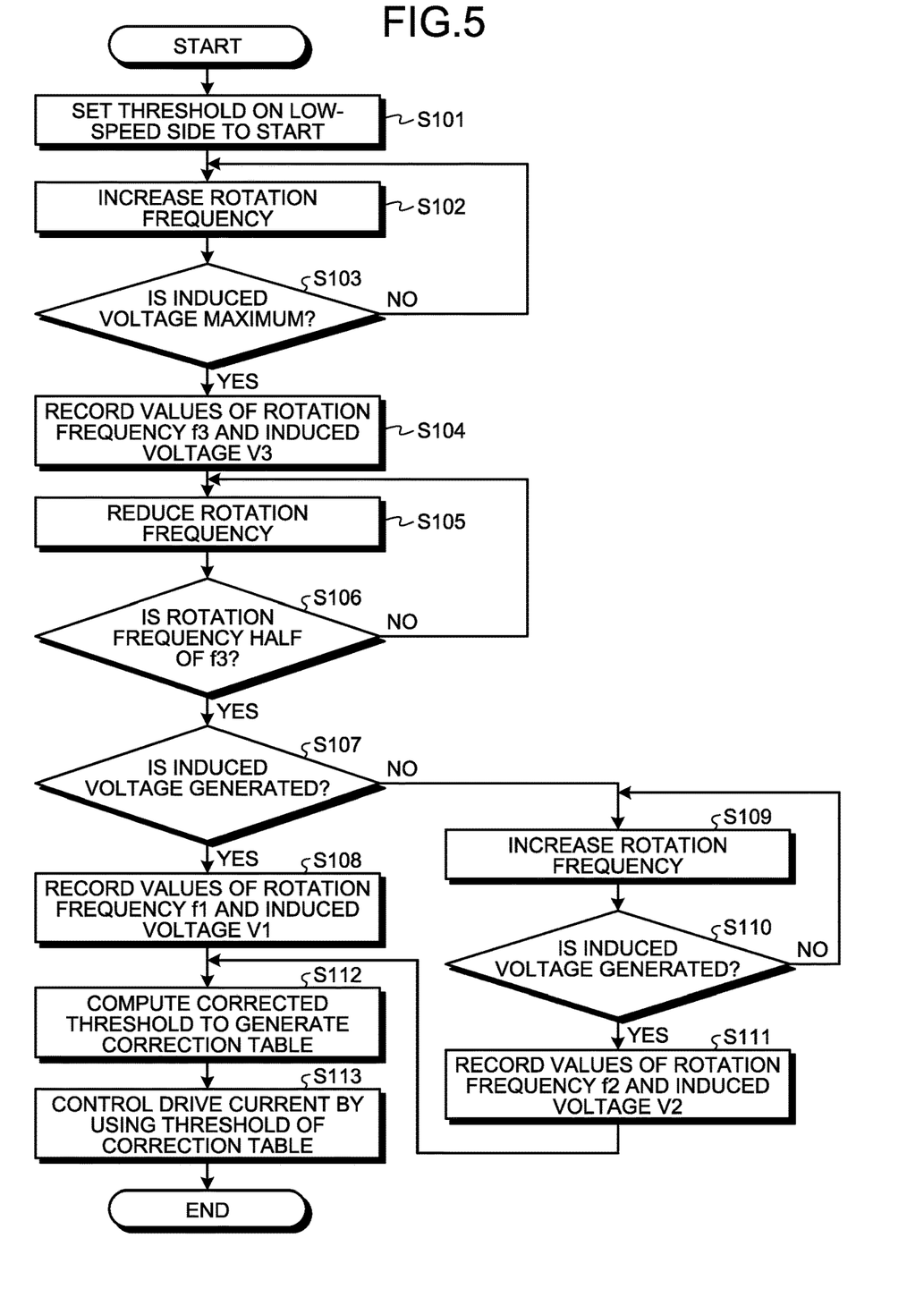
FIG. 5 is a flowchart illustrating the control method on the low-speed side.

FIG. 5 is a flowchart illustrating the control method on the low-speed side, which corresponds to the above-mentioned control method. A threshold on a low-speed side is set, and operation is started in an unloaded state, for example (Step S101). Initial values are stored in the storage 413. A value of a drive current corresponding to each micro-step, an induced voltage, an excitation mode, and the like are set as the initial values. Next, a frequency of a switching signal is increased to increase a rotation frequency (Step S102).

Whether or not an induced voltage is the maximum is determined (Step S103). In other words, whether or not the induced voltage is saturated is detected. When the induced voltage is the maximum (Step S103: Yes), the rotation frequency f3 and the induced voltage V3 at this time are recorded (Step S104). When the induced voltage is not maximum (Step S103: No), the rotation frequency is further increased. Next, a frequency of the switching signal is reduced to reduce the rotation frequency (Step S105).

When the rotation frequency becomes half of f3 (S106: Yes), an induced voltage is detected. When generation of the induced voltage is detected (S107: Yes), the rotation frequency f1 at this time and the detected induced voltage V1 are recorded (Step S108).

When an induced voltage is not detected (Step S107: No), the rotation frequency is increased (Step S109). When an induced voltage is generated by the increase in the rotation frequency (Step S110: Yes), values of the rotation frequency f2 at this time and the detected induced voltage V2 are recorded (Step S111). When an induced voltage is not generated (Step S110: No), the rotation frequency is increased.

A threshold obtained by correcting in accordance with each rotation frequency by using the formula (1) or the formula (2) is computed, and a correction table is generated (Step S112). The formula (1) is used when an induced voltage is generated, and the formula (2) is used when an induced voltage is not generated. The correction table is stored in the storage 413. The drive current is controlled in accordance with a comparison result between a threshold of the correction table and the induced voltage detected during the operation (Step S113).

By employing the control flow, it is possible to enlarge, on the basis of the corrected threshold, a control range according to the torque on a low-speed side. Therefore, the drive current is controlled in real time in accordance with a needed torque, so that it is possible to reduce power consumption while preventing step-out.

Figure 6:
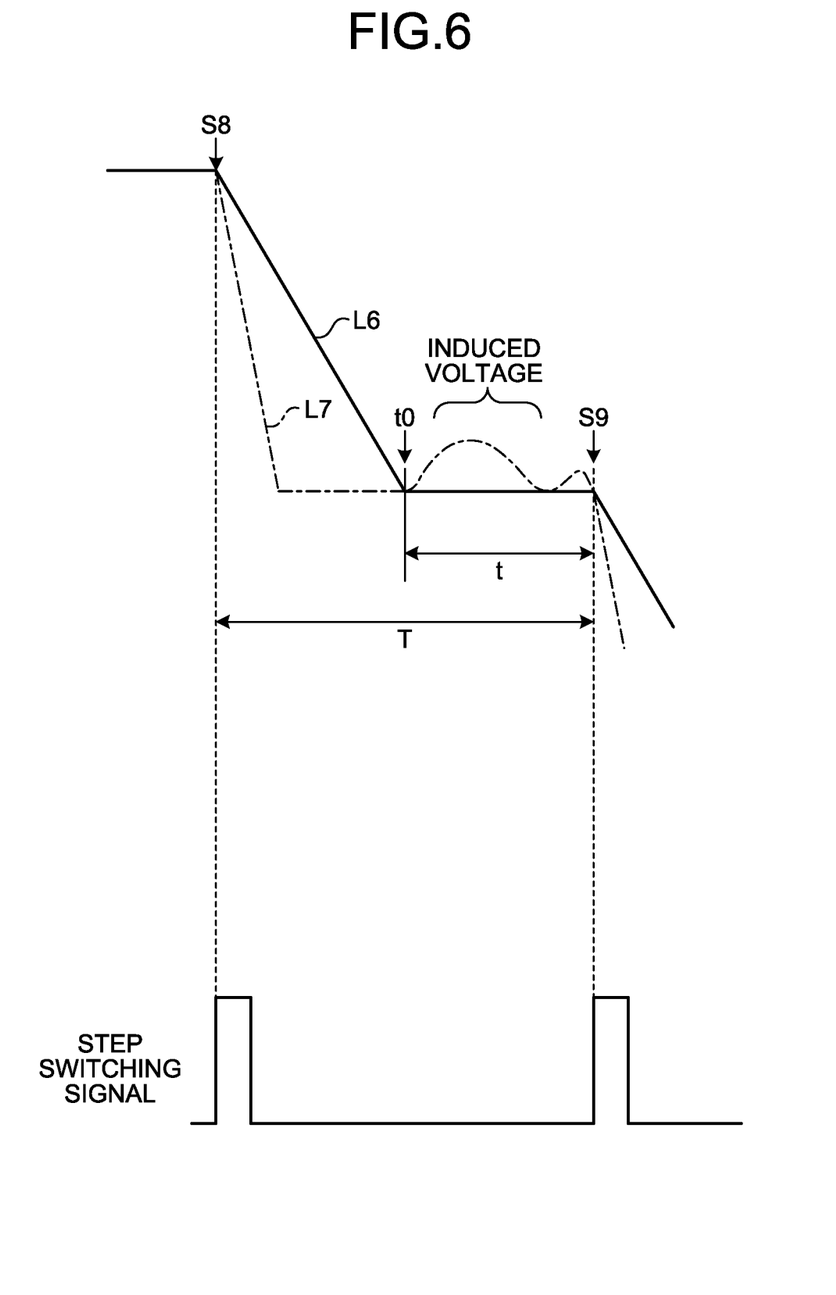
FIG. 6 is a diagram illustrating one example of a control method on a high-speed side.

FIG. 6 is a diagram illustrating one example of a control method on a high-speed side. In an upper part of FIG. 6, a solid line L6 indicates the drive current and a dashed line L7 indicates the output voltage, and a lower part of FIG. 6 indicates the switching signal, which corresponds to an interval between the timings S8 to S9 illustrated in FIG. 2, in other words, a step whose set value of the drive current is zero (0%).

The induced voltage is detected as an output voltage after the drive current becomes zero. Thus, in FIG. 6, an increase in the output voltage during a determination time interval t, which is from a time point t0 when the drive current becomes zero to the timing S9 when the next switching signal is supplied, indicates the induced voltage.

When the frequency of the switching signal is increased to go into a high-speed operation, a period T between the steps becomes short. The drive current reduces with a constant time delay with respect to falling of the output voltage. Hence, when the period T becomes short, the determination time interval t also becomes short, and thus detection of an induced voltage is difficult. Thus, when the determination time interval t is shorter than a predetermined detectable time interval, the mode is changed into an excitation mode having the longer period T. For example, a 4W1-2 phase excitation is changed into a 2W1-2 phase excitation.

By employing the control, it is possible to reliably detect an induced voltage, and further to appropriately control a drive current by comparison between the induced voltage and a threshold. In other words, a detection range of the induced voltage on a high-speed side is enlarged, and the drive current is reduced when the induced voltage is higher than the threshold, so that it is possible to reduce power consumption.

Figure 7:
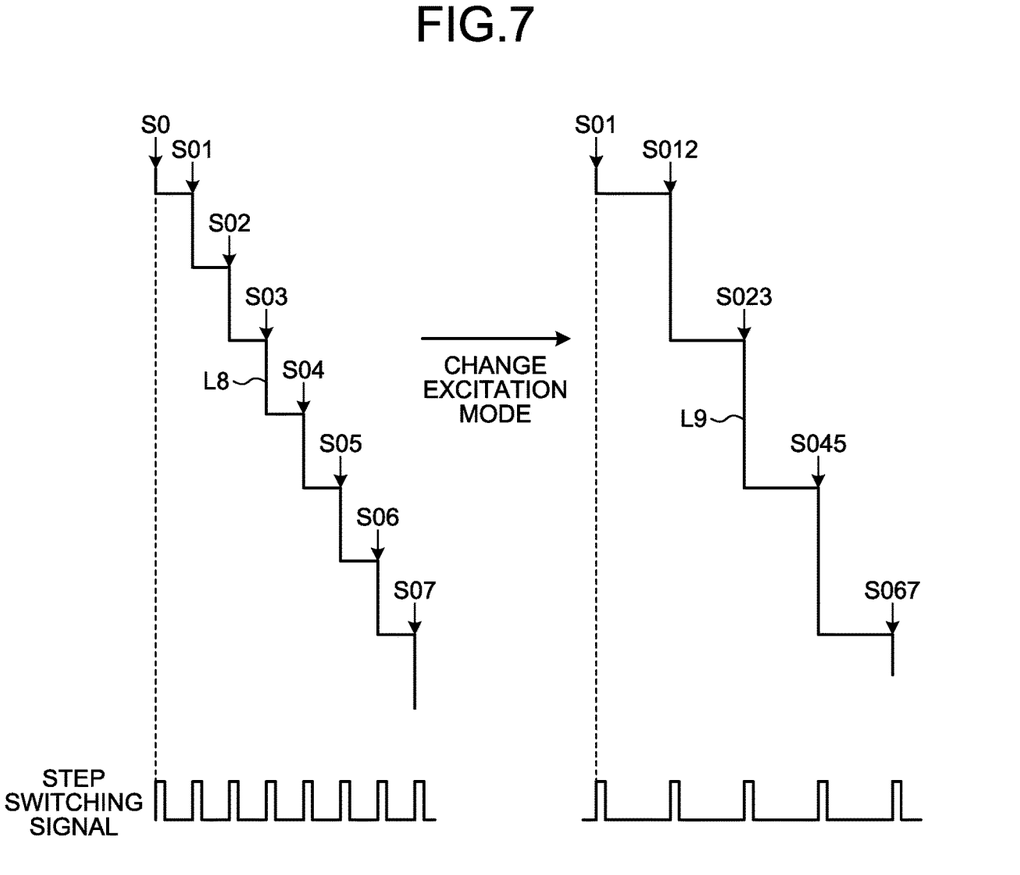
FIG. 7 is a diagram illustrating one example of a change in an excitation mode.

FIG. 7 is a diagram illustrating one example of a change in the excitation mode. A state before the excitation mode is changed is illustrated on a left side of FIG. 7, and a state after the excitation mode is changed is illustrated on a right side of FIG. 7. A drive current waveform L8 illustrated on the left side has steps whose drive currents reduce in accordance with a shift from timings S0 and S01 to a timing S07, which is respond to a switching signal.

A drive current waveform L9 illustrated on the right side has changed into an excitation mode whose steps have longer widths, each of which corresponds to widths of two steps of the drive current waveform L8, which is respond to a switching signal whose frequency has changed. For example, a 4W1-2 phase excitation mode illustrated on the left side is changed into a 2W1-2 phase excitation mode on the right side.

By employing the change in the excitation mode, a period between switching signals becomes long, so that it is possible to extend a determination time interval of the induced voltage. Thus, an induced voltage is detected and a drive current is adjusted on the basis of the detected induced voltage, so that it is possible to appropriately control the drive current in accordance with a torque.

Note that, even when the excitation mode has been changed, a rotation frequency may be the same. For example, an excitation mode, in which a drive current is changed by single step with respect to single switching signal, is changed into an excitation mode, in which the drive current is changed by two steps with respect to the single switching signal, so that it is possible to equalize rotation frequencies of the stepping motor even when a frequency of the switching signal has reduced by half. Therefore, rotation frequencies of the stepping motor are equalized even when the excitation mode is automatically changed in response to shortening of the determination time interval, so that a user is able to continue to use the stepping motor without paying attention to the change in the excitation mode.

Figure 8:
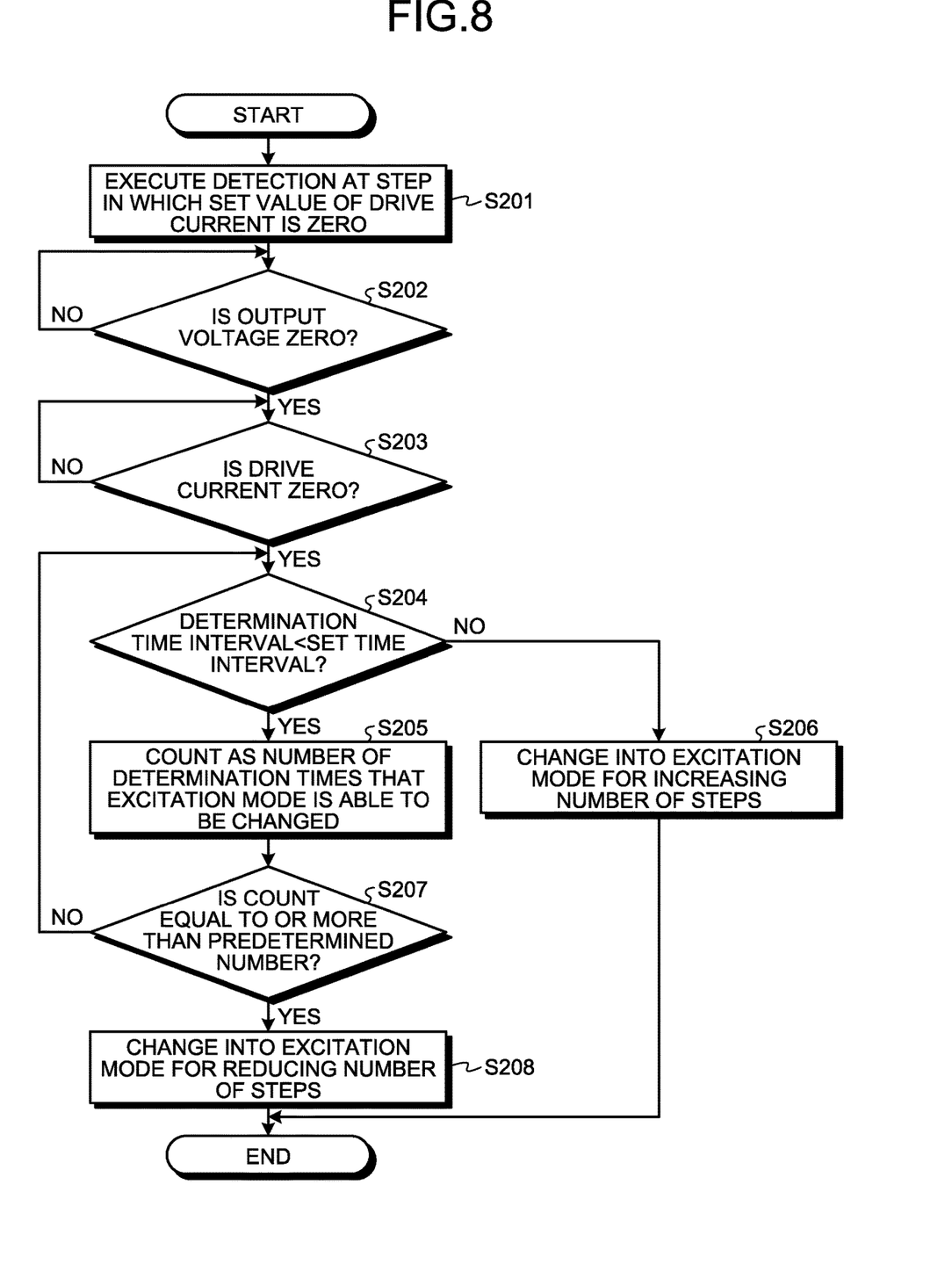
FIG. 8 is a flowchart illustrating the control method on the high-speed side.

FIG. 8 is a flowchart illustrating the control method on a high-speed side. A rotation frequency of the stepping motor is increased, an operation on a high-speed side is started, and a detection is executed at step in which a set value of a drive current is zero (Step S201).

Whether or not an output voltage is zero is detected (Step S202). When the output voltage is zero is detected (Step S202: Yes), a time point when the drive current becomes zero is detected (Step S203). When the output voltage is not zero (Step S202: No), the detection is continued. When the drive current becomes zero is detected (Step S203: Yes), a time interval from the time point when the drive current becomes zero until the next switching signal is supplied, in other words, a determination time interval and a predetermined set time interval are compared with each other (Step S204). When the drive current is not zero (Step S203: No), the detection is continued.

Each time when the determination time interval is shorter than the set time interval (Step S204: Yes), it is counted as one of the number of determination times that the excitation mode is able to be changed, so that an increment is executed on the number of determination times (Step S205). When the determination time interval is longer than the set time interval (Step S204: No), the mode is changed into an excitation mode for increasing the number of steps (Step S206). In other words, the mode is changed into an excitation mode for shortening a step width. When the number of the steps is increased, it is possible to take advantage of features obtained by a micro-step that finely controls the rotation angle.

When a count of the number of the determination times is equal to or more than a predetermined number (Step S207: Yes), the mode is changed into an excitation mode for reducing the number of steps, in other words, extending a step width (Step S208). Thus, a time interval, in which an induced voltage is able to be detected, is extended, so that it is possible to reliably detect the induced voltage. By employing the control for changing the excitation mode when the count of the number of the determination times is equal to or more than the predetermined number, it is possible to improve the reliability in determination of whether or not the excitation mode is able to be changed.

When the count of the number of the determination times is less than the predetermined number (Step S207: No), the process for comparing the determination time interval and the set time interval with each other is continued.

The excitation mode is changed in accordance with comparison between the determination time interval and the predetermined set time interval, so that it is possible to reliably detect the induced voltage on the high-speed side. Thus, the drive current is appropriately controlled in accordance with the detected induced voltage, so that it is possible to reduce power consumption while preventing supply of a surplus drive current with respect to a needed torque.

Figure 9:
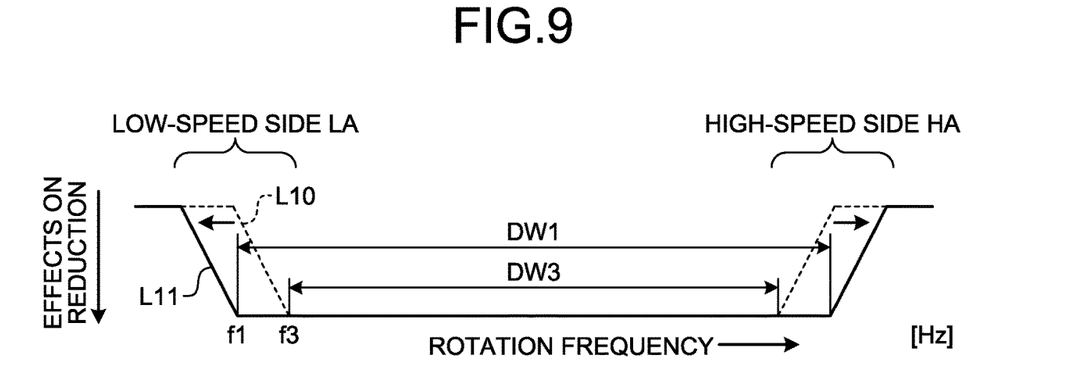
FIG. 9 is a diagram illustrating effects.

FIG. 9 is a diagram illustrating effects according to the present embodiment. The lateral axis indicates a rotation frequency, and the vertical axis relatively indicates effects on reduction in the drive current. The controller of the stepping motor and the control method of the stepping motor according to the present embodiment detect an induced voltage on a low-speed operation side LA and a high-speed operation side HA, so as to appropriately control the drive current in accordance with a torque.

In other words, a threshold of the induced voltage is reduced in proportion to the frequency on the low-speed side LA, so that it is possible to enlarge a controllable region of the drive current according to the torque from a dashed line L10 to a solid line L11, as described with reference to FIG. 3. Furthermore, a period of the switching signal is extended on the high-speed side HA, so that it is possible to similarly enlarge an operation region, in which the induced voltage is able to be detected, into a range from the dashed line L10 to the solid line L11.

In other words, a controllable region, in which power consumption is reduced while reducing a surplus drive current, is able to be enlarged from DW3 to DW1. The drive current is appropriately adjusted in accordance with a needed torque within a wide-range operation region, so that it is possible to reduce power consumption while preventing step-out.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A controller of a motor, the controller comprising:
a first circuit configured to control a drive current to be supplied to an exciting coil of a stepping motor;
a second circuit configured to detect an induced voltage appearing as an output voltage of the exciting coil when the drive current is zero; and
a drive controlling circuit configured to
compare a threshold and an induced voltage detected by the second circuit, the threshold being proportional to frequency of a switching signal, the switching signal indicating a timing to change a set value of a drive current, and
supply the first circuit with a control signal for controlling a value of the drive current in accordance with a comparison result,
wherein the drive controlling circuit is further configured to set a value as the threshold to be applied to a low-speed region being an operation region where frequency of the switching signal is lower than a predetermined frequency, the value being set to reduce in proportion to the frequency of the switching signal, and change an excitation mode of the stepping motor to be applied to a high-speed region being an operation region where frequency of the switching signal is higher than the predetermined frequency, the excitation mode being changed in accordance with a time interval from a time point at which the drive current becomes zero until a next switching signal is output.

2. The controller according to claim 1, wherein the drive controlling circuit is further configured to:

generate data table containing the threshold to be applied to the low-speed region, the data table being generated by using values of a first induced voltage and a second induced voltage, the first induced voltage being generated at a first frequency of the switching signal, the second induced voltage being generated at a second frequency of the switching signal, and store the data table in a storage device.

3. The controller according to claim 1, wherein the drive controlling circuit is further configured, in the high-speed region, to change into an excitation mode in which a period of the switching signal is extended, when the time interval from a time point at which the drive current becomes zero until a next switching signal is output is shorter than a predetermined time interval.

4. The controller according to claim 1, wherein the drive controlling circuit is further configured, in the high-speed region, to change into the excitation mode, when a number of times that the time interval from a time point at which the drive current becomes zero until a next switching signal is output is shorter than a predetermined time interval is equal to or more than a previously set number.

5. The controller according to claim 1, wherein the drive controlling circuit is further configured, in the high-speed region, to change into an excitation mode in which a period of the switching signal is shortened, when the time interval from a time point at which the drive current becomes zero until a next switching signal is output is longer than a predetermined time interval.

6. The controller according to claim 1, further comprising an H-bridge circuit configured to supply the exciting coil with the drive current, the H-bridge circuit including two pairs of transistors, each pair consisting of a PMOS transistor and an NMOS transistor, wherein the second circuit includes a circuit group for each of the two pairs of transistors, the circuit group including:

a first voltage detecting circuit configured to detect a source-drain voltage of the NMOS transistor in which drain current in a reverse direction flows;

a second voltage detecting circuit configured to detect a drain-source voltage of the NMOS transistor in which drain current in a forward direction flows;

a timing controlling circuit configured to output a timing controlling signal indicating timing to detect the induced voltage; and a selection circuit configured to select, in response to the timing controlling signal, one of detection values obtained by the first and second voltage detection circuits, and supply the drive controlling circuit with the selected one of the detection values as induced voltage information.

7. A control method of a motor, the method being implemented by a controller including a first circuit and a second circuit, the first circuit controlling a drive current to be supplied to an exciting coil of a stepping motor, the second circuit detecting an induced voltage appearing as an output voltage of the exciting coil when the drive current is zero, the method comprising:

comparing a threshold and an induced voltage detected by the second circuit, the threshold being proportional to frequency of a switching signal, the switching signal indicating a timing to change a set value of a drive current;

supplying the first circuit with a control signal for controlling a value of the drive current in accordance with a result of the comparing;

setting a value as the threshold to be applied to a low-speed region being an operation region where frequency of the switching signal is lower than a predetermined frequency, the value being set to reduce in proportion to the frequency of the switching signal; and changing an excitation mode of the stepping motor to be applied to a high-speed region being an operation region where frequency of the switching signal is higher than the predetermined frequency, the excitation mode being changed in accordance with a time interval from a time point at which the drive current becomes zero until a next switching signal is output.

8. The control method according to claim 7, further comprising:

generating data table containing the threshold to be applied to the low-speed region, the data table being generated by using values of a first induced voltage and a second induced voltage, the first induced voltage being generated at a first frequency of the switching signal, the second induced voltage being generated at a second frequency of the switching signal, and storing the data table in a storage device.

9. The control method according to claim 7, further comprising:

in the high-speed region, changing into an excitation mode in which a period of the switching signal is extended, when a number of times that the time interval from a time point at which the drive current becomes zero until a next switching signal is output is shorter than a predetermined time interval is equal to or more than a previously set number.

10. The control method according to claim 7, further comprising:

in the high-speed region, changing into an excitation mode in which a period of the switching signal is shortened, when the time interval from a time point at which the drive current becomes zero until a next switching signal is output is longer than a predetermined time interval.

11. A controller of a motor, the controller comprising:

a first circuit configured to control a drive current to be supplied to an exciting coil of a stepping motor;

a second circuit configured to detect an induced voltage appearing as an output voltage of the exciting coil when the drive current is zero; and a drive controlling circuit configured to compare a threshold and an induced voltage detected by the second circuit, the threshold being proportional to frequency of a switching signal, the switching signal indicating a timing to change a set value of a drive current, and supply the first circuit with a control signal for controlling a value of the drive current in accordance with a comparison result, wherein the drive controlling circuit is further configured to change an excitation mode of the stepping motor to be applied to a high-speed region being an operation region where frequency of the switching signal is higher than a predetermined frequency, the excitation mode being changed in accordance with a time interval from a time point at which the drive current becomes zero until a next switching signal is output.

12. The controller according to claim 11, wherein
the drive controlling circuit is further configured, in the high-speed region, to change into an excitation mode in which a period of the switching signal is extended, when the time interval from a time point at which the drive current becomes zero until a next switching signal is output is shorter than a predetermined time interval.

13. The controller according to claim 11, wherein
the drive controlling circuit is further configured, in the high-speed region, to change into the excitation mode, when a number of times that the time interval from a time point at which the drive current becomes zero until a next switching signal is output is shorter than a predetermined time interval is equal to or more than a previously set number.

14. The controller according to claim 11, wherein
the drive controlling circuit is further configured, in the high-speed region, to change into an excitation mode in which a period of the switching signal is shortened, when the time interval from a time point at which the drive current becomes zero until a next switching signal is output is longer than a predetermined time interval.

15. A control method of a motor, the method being implemented by a controller including a first circuit and a second circuit, the first circuit controlling a drive current to be supplied to an exciting coil of a stepping motor, the second circuit detecting an induced voltage appearing as an output voltage of the exciting coil when the drive current is zero, the method comprising:

comparing a threshold and an induced voltage detected by the second circuit, the threshold being proportional to frequency of a switching signal, the switching signal indicating a timing to change a set value of a drive current;

supplying the first circuit with a control signal for controlling a value of the drive current in accordance with a result of the comparing; and changing an excitation mode of the stepping motor to be applied to a high-speed region being an operation region where frequency of the switching signal is higher than the predetermined frequency, the excitation mode being changed in accordance with a time interval from a time point at which the drive current becomes zero until a next switching signal is output.

16. The control method according to claim 15, further comprising, in the high-speed region, changing into an excitation mode in which a period of the switching signal is extended, when the time interval from a time point at which the drive current becomes zero until a next switching signal is output is shorter than a predetermined time interval.

17. The control method according to claim 15, further comprising, in the high-speed region, changing into the excitation mode, when a number of times that the time interval from a time point at which the drive current becomes zero until a next switching signal is output is shorter than a predetermined time interval is equal to or more than a previously set number.

18. The control method according to claim 15, further comprising, in the high-speed region, changing into an excitation mode in which a period of the switching signal is shortened, when the time interval from a time point at which the drive current becomes zero until a next switching signal is output is longer than a predetermined time interval.

* * * * *